(12) United States Patent
Schöferle

(10) Patent No.: US 12,228,228 B2
(45) Date of Patent: Feb. 18, 2025

(54) ROTARY JOINT WITH A MECHANICAL SEAL

(71) Applicant: Christian Maier GmbH & Co KG, Maschinenfabrik, Heidenheim (DE)

(72) Inventor: Manuel Schöferle, Ulm (DE)

(73) Assignee: Christian Maier GmbH & Co KG, Maschinenfabrik, Heidenheim (DE)

( * ) Notice: Subject to any disclaimer, the term of this patent is extended or adjusted under 35 U.S.C. 154(b) by 0 days.

(21) Appl. No.: 18/388,125

(22) Filed: Nov. 8, 2023

(65) Prior Publication Data
US 2024/0159337 A1    May 16, 2024

(30) Foreign Application Priority Data
Nov. 11, 2022   (DE) .......................... 102022129880.9

(51) Int. Cl.
*F16L 27/08*    (2006.01)
(52) U.S. Cl.
CPC ................. *F16L 27/082* (2013.01)
(58) Field of Classification Search
CPC .................................................. F16L 27/082
USPC .......................................... 285/93, 278, 279
See application file for complete search history.

(56) References Cited

U.S. PATENT DOCUMENTS

| | | | |
|---|---|---|---|
| 5,042,846 A * | 8/1991 | Delamare | ............... F16L 17/10 |
| | | | 285/98 |
| 5,448,924 A | 9/1995 | Nagai et al. | |
| 6,386,595 B1 | 5/2002 | Peppel | |
| 10,371,297 B2 * | 8/2019 | Petrou | .................. B23Q 11/103 |

FOREIGN PATENT DOCUMENTS

| | | |
|---|---|---|
| DE | 34 26 539 A1 | 1/1985 |
| DE | 196 22 840 A1 | 12/1997 |
| DE | 10 2006 060 213 A1 | 7/2007 |
| EP | 0 203 675 A1 | 12/1986 |
| EP | 0 568 184 A1 | 11/1993 |
| EP | 3 698 073 | 8/2020 |
| WO | WO 95/27213 | 10/1995 |

* cited by examiner

*Primary Examiner* — David Bochna
(74) *Attorney, Agent, or Firm* — Farjami & Farjami LLP

(57) ABSTRACT

A rotary joint including a stator and a rotor, each having at least one fluid channel, and a fluid transfer interface between the stator and the rotor, via which a fluid flows from the fluid channel in the stator into the fluid channel in the rotor, the fluid transfer interface being sealed off with respect to the surrounding environment by a mechanical seal, which comprises an abrasive sliding ring, and the sliding ring bears in an axial direction in an elastically biased manner against at least one mating ring and forms a seal face therewith. An axial displacement detection device is provided, which is designed to detect, in the event of wear on the sliding ring, an associated axial displacement of the stator and/or rotor. The axial displacement detection device comprises a rotary encoder on the rotor and a sensor that detects a position of the rotary encoder.

14 Claims, 3 Drawing Sheets

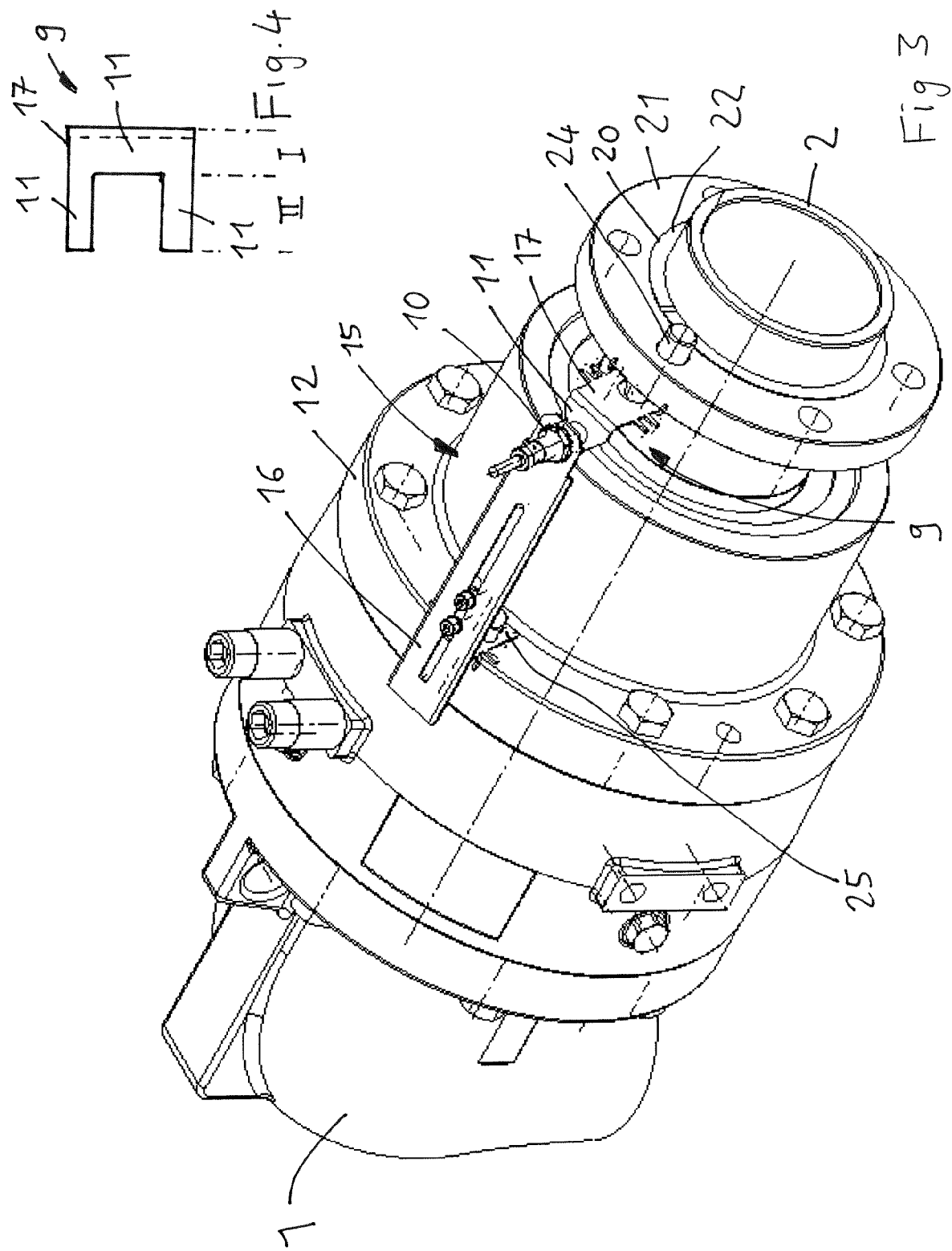

ROTARY JOINT WITH A MECHANICAL SEAL

RELATED APPLICATION(S)

This application claims priority from German Patent Application Serial No. DE 102022129880.9, filed Nov. 11, 2022, which is hereby incorporated by reference into the present application.

FIELD

The present invention relates to a rotary joint with a mechanical seal.

BACKGROUND

Rotary joints of the type to which the present invention relates comprise a stator and a rotor, which each include at least one fluid channel. A fluid transfer interface is provided between the stator and the rotor, via which a fluid can be transferred from the fluid channel of the stator into the fluid channel of the rotor, or from the fluid channel of the rotor into the fluid channel of the stator. The fluid thus flows from the stator into the rotor, or vice versa, wherein it is also possible, in particular, for a fluid transfer interface to be provided between multiple fluid channels in the stator and in the rotor in order to establish a forward flow and a return flow. It is also possible for more than two fluid channels to be provided in the stator, each of these being connected to at least one fluid channel in the rotor.

The fluid transfer interface is sealed off with respect to the surrounding environment by means of a mechanical seal. The sliding ring bears in an axial direction in an elastically biased manner against at least one mating ring and forms a seal face therewith. The sliding ring is subject to wear due to the relative rotation between the sliding ring and the mating ring. Owing to the wear and as a result of being elastically supported, an axial displacement occurs at least in one part of the rotary joint, i.e. in the stator and/or in the rotor. In one type of construction, only the sliding ring is displaced. In other types of construction, such as the type to which the present invention particularly relates, a radially outer region of the stator and/or rotor, in particular the entire stator, is displaced. In order to be able to predict a remaining reliable service life, it is desirable to detect the extent of the wear.

To this end, EP 3 698 073 B1 suggests providing, in addition to a position sensor for detecting the position of the sliding ring in the axial direction, also a temperature sensor outside of the fluid transfer interface, i.e. on a leakage side, remote from the fluid channel, of the seal face between the sliding ring and the mating ring, wherein the temperature of a leakage flow escaping via the seal face is detected by the temperature sensor. The position sensor may be designed as a Hall sensor, which collaborates with a magnet mounted on the sliding ring. When the magnet moves in the axial direction, this movement can be detected by the Hall sensor.

DE 34 26 539 A1 discloses a method for monitoring the abrasion of the seal faces of a mechanical seal. To this end, a probe is provided radially in relation to the axially movable mechanical seal element of the seal or radially in relation to a part that moves axially with the mechanical seal element, so that a signal which is generated by the surface of said mechanical seal element or said part and which is directed radially outwards can be picked up by the probe. The surface of the mechanical seal element or of the part is designed in such a way that, when the mechanical seal element moves axially relative to the probe, a signal change occurs, which indicates the abrasion on the seal faces. By way of example, the radial gap between the probe and a cylindrical surface located opposite the probe changes when the mechanical seal element or the component connected thereto moves axially relative to the probe when seal abrasion occurs. This brings about a change in the signal measured by the probe. Alternatively, a conductive insert or an insert in the form of a semiconductor may be inserted in the mechanical seal element, said insert generating a signal in the probe when maximum abrasion is reached. The use of an optical probe is also possible.

A system similar to the one mentioned above is disclosed in U.S. Pat. No. 5,448,924 A.

One disadvantage of the embodiments mentioned above is that the probe for measuring the axial displacement must be provided in the rotary joint in addition to a rotational speed sensor that is usually present anyway, and therefore a suitably large installation space is required for the measuring devices.

WO 95/27213 A proposes a device for sensing a rotational movement and an axial displacement of a body by means of a single sensor. To this end, a structure that can be sensed by the sensor is applied to a rotating component, which structure represents an axial displacement of the component by way of a first significant change in the output signal of the sensor and represents a change in the rotational speed of the component about its axis of rotation by way of a second significant change in the output signal of the sensor. The structure may take the form of a triangular, sawtooth-like or similar pattern. The sensor may be an inductive sensor or a Hall sensor. Thus, both information about the rotational speed and information about the axial position of the component can be read from this signal. Since the pattern extends continuously around the entire circumference of the component in order to produce the desired signal changes, the magnitude of the signal change is comparatively small, and therefore the sensor must have a high sensitivity and be located very closely opposite the pattern in the radial direction. Only distances of a few tenths of a millimetre are permitted. The device is therefore suitable only for rotating components, generally only those of small external diameter, which have a low imbalance and do not tend to wobble about the axis of rotation. In addition, the complexity of installation and the calibration are comparatively time-consuming.

SUMMARY

The object underlying the present invention is that of specifying a rotary joint comprising a sliding ring that is subject to wear, the wear on which can be precisely determined during operation of the rotary joint, wherein the rotary joint does not require any axial displacement sensor provided in addition to a rotational speed sensor.

The object according to the invention is achieved by a rotary joint having the features of claim 1. The dependent claims describe advantageous and particularly useful embodiments of the invention.

The rotary joint according to the invention comprises a stator and a rotor, which each include a fluid channel, wherein a fluid transfer interface is provided between the stator and the rotor, via which a fluid flows from the fluid channel in the stator into the fluid channel in the rotor, or vice versa. A fluid can thus be transferred from the stator into the rotor, for example a cooling medium or a process liquid or a process gas or the like. Multiple fluid channels may be provided in the stator and rotor, which are connected to each other via the fluid transfer interface, so that multiple fluids can be exchanged separately from each other between the stator and the rotor via the fluid transfer interface. By way of example, a forward flow and a return flow are provided in the rotary joint, so that in particular a cooling medium can be transferred from the stator into the rotor, said cooling medium being fed back, in its heated state, from the rotor into the stator after performing its cooling function.

Provided in the fluid transfer interface is a mechanical seal, which comprises an abrasive sliding ring. By means of the mechanical seal, the fluid transfer interface is sealed off from the surrounding environment, so that the fluid cannot escape from the fluid channels. The sliding ring bears in an axial direction in an elastically biased manner against at least one mating ring and forms a seal face with this mating ring.

In principle, the sliding ring may rotate with the rotor and may accordingly be connected to the rotor in such a way as to rotate therewith, or it may be held by the stator in a stationary manner and therefore may not rotate. According to another embodiment, the sliding ring is inserted freely between the rotor and the stator, so that its rotation is undefined. This means that, prior to operation of the rotary joint, it is not defined whether and at what speed the sliding ring rotates. In particular, the sliding ring rotates only intermittently and/or at a lower speed than the rotor. The present invention is particularly suitable for such an embodiment.

According to the invention, an axial displacement detection device is provided, which is designed to detect, in the event of wear on the sliding ring, an associated axial displacement of the stator and/or rotor. It is not necessary for the entire rotor and/or stator to be displaced, but instead optionally only a part thereof. The axial displacement detection device comprises a rotary encoder on the rotor, in particular radially outside the latter, and a sensor that detects a position of the rotary encoder, said sensor being located radially opposite the rotary encoder. The rotary encoder comprises at least one discrete marker or a plurality of discrete markers arranged at intervals one after the other in the circumferential direction, said markers being arranged on a radially outer surface of the rotor. The at least one discrete marker or the plurality of discrete markers arranged at intervals vary along the axial direction in their extent in the circumferential direction, and/or different numbers of individual discrete markers are provided, one after the other in the circumferential direction, in different axial sections of the rotor.

The at least one discrete marker thus also forms a structure that can be sensed by the sensor such that an axial displacement of the rotor, i.e. at least of the part of the rotor that bears the marker, is represented by a first significant change in an output signal of the sensor, and a change in the rotational speed of the rotor about its axis of rotation is represented by a second significant change in the output signal of the sensor. By way of example, the discrete marker has the shape of a triangle, which in particular is solid. Preferably, the base side of the triangle extends in the circumferential direction of the rotor or in the direction of rotation of the rotor, and the height extends in the axial direction. In the case of a plurality of discrete markers, it is possible for a plurality of such triangles, in particular identical triangles, to be arranged on the rotor at intervals from each other in the circumferential direction.

By virtue of the embodiment according to the invention comprising at least one discrete marker, the output signal of the sensor changes particularly significantly, even if the sensor is arranged at a radial distance or radial gap to the rotary encoder in the radial direction of at least 1 or 2 mm, in particular at least 5 mm, as provided in one embodiment of the invention. This allows for a certain imbalance and/or a certain wobble of the rotor during operation of the rotary joint, this possibly being necessary in practice.

The sensor generates in particular an on/off signal, wherein a signal change occurs whenever a discrete marker enters the detection area of the sensor and whenever this discrete marker leaves the detection area of the sensor again.

Other advantageous embodiments of the discrete marker include markers having steps or rounded areas such that the extent of the individual discrete marker along the circumference varies in each case in the course of the marker along the axial direction.

A variation in the circumferential extent of the marker along its extension in the axial direction may also be achieved by providing a different number of individual discrete markers in different axial sections.

To facilitate installation, the position of the sensor and/or of the at least one rotary encoder may be adjustable in the radial direction and/or axial direction.

According to one embodiment, the rotary encoder extends only over part of the circumference, in particular less than 45° or less than 10°. The rest of the circumference is therefore free of markers detected by the sensor. This enables a particularly flexible and cost-effective arrangement of the rotary encoder.

Preferably, the stator comprises a housing having at least one fluid inlet and/or fluid outlet, and the sensor is borne by a support element connected to the housing. By virtue of such a support element provided separately to the housing, it is possible to reduce the heat input from the housing, which is heated by the fluid, into the sensor. By way of example, the support element comprises a sheet-metal strip that bears the sensor, said strip preferably being movably connected to the housing. This reduces heat conduction from the housing to the sensor and facilitates installation of the sensor.

According to one embodiment, thermal insulation, for example in the form of an insulation layer, is provided between the support element and the housing.

The rotary encoder may preferably be formed by an angled plate connected to the rotor, which angled plate then bears or has the at least one discrete marker. The marker may thus be formed directly in the angled plate, may be formed by the latter, or may also be provided in an additional component connected to the angled plate.

The connection of the rotary encoder to the rotor by means of an angled plate or another intermediate component may likewise reduce the heat input from the rotor into the area of the sensor and enables particularly easy installation of the rotary encoder, which may optionally even be retrofitted. By way of example, the rotary encoder may be connected to the rotor by means of a clamping flange. Such a clamping flange comprises, for example, an in particular slotted inner ring which is pressed onto the rotor by an outer ring. The contact surfaces between the inner ring and the outer ring may be at an angle to the axis of rotation, so that an axial displacement of the outer ring causes the inner ring, which is preferably C-shaped, i.e. has a gap between its circumferential ends, to jam on the rotor.

Of course, the rotary encoder may also be connected to the rotor in a different way, for example as a flange screwed onto a thread of the rotor or by another screw connection or a materially bonded connection. Other embodiments are possible.

A control device is preferably provided, which processes signals that are generated by the sensor as a function of the current circumferential position of the at least one marker, wherein the control device and/or the sensor generates a sequence of on/off signals which, as set out above, are generated when a marker enters and leaves the detection area of the sensor.

According to one embodiment of the invention, the sliding ring forms, on each of its two opposite end faces, i.e. axially, a seal face with a respective mating ring and is rotatable in the circumferential direction relative to both mating rings. The present invention can therefore be considered both in the case of mechanical seals in which the sliding ring is rotatable relative to a mating ring on just one side. In this case, for example, the mating ring is formed by the rotor or rotates with the rotor, and the sliding ring is connected to the stator, in particular in a rotationally fixed manner. It is also possible for the sliding ring to rotate together with the rotor and, for example, for the mating ring to be connected to the stator in a rotationally fixed manner or to be formed by the stator. In the case of a sliding ring that provides sealing on two sides, said sliding ring may bear against a mating ring in the stator and against a mating ring in the rotor.

DESCRIPTION OF THE DRAWINGS

The invention will be described as an example below on the basis of an exemplary embodiment and with reference to the figures.

In the figures:

FIG. 3 shows an isometric view of the rotary joint from FIG. 1;

FIG. 4 shows an alternative design of a possible rotary encoder.

DETAILED DESCRIPTION

Figure 1:
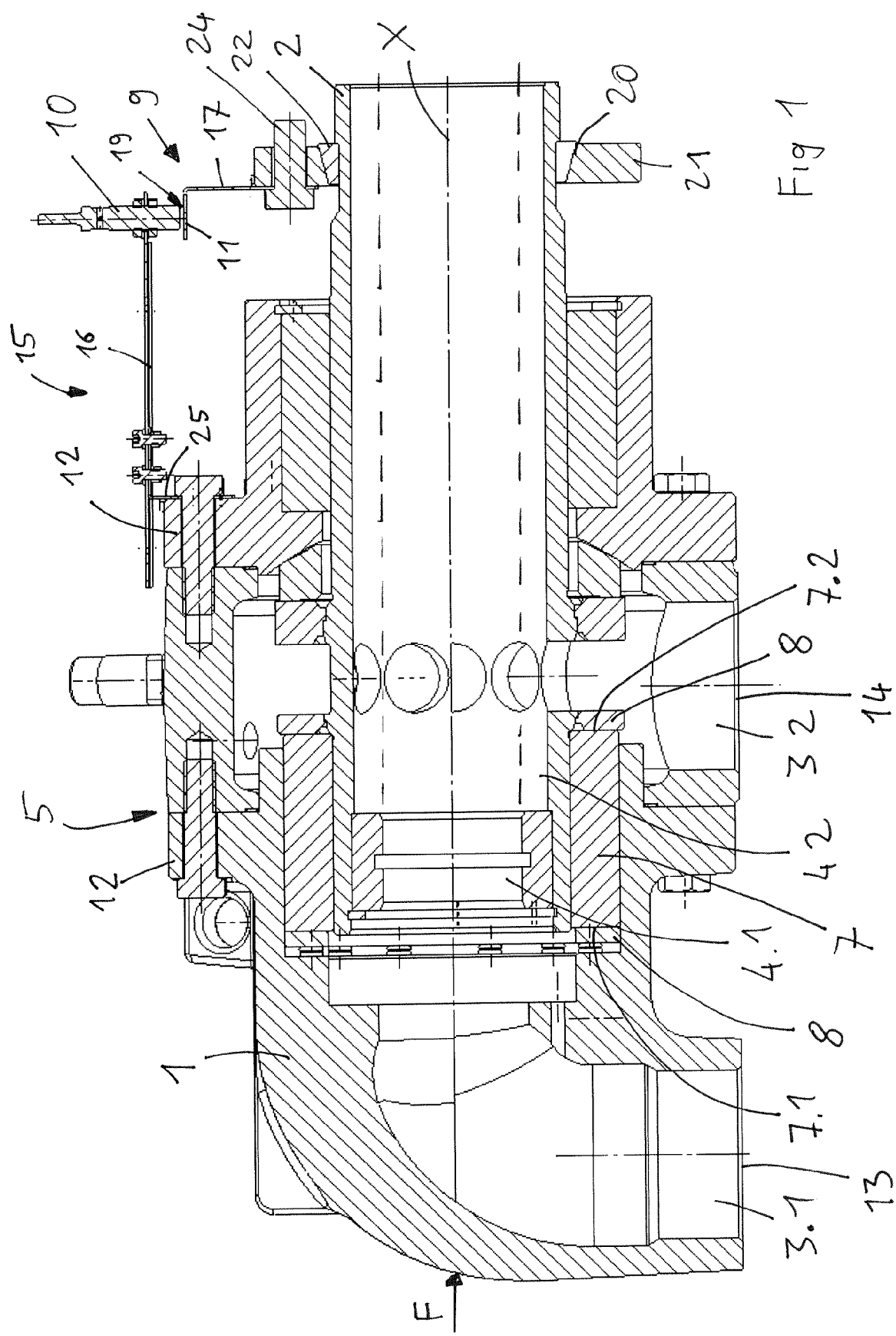
FIG. 1 shows, in an axial cross-section, an exemplary embodiment of a rotary joint designed according to the invention.
Figure 2:
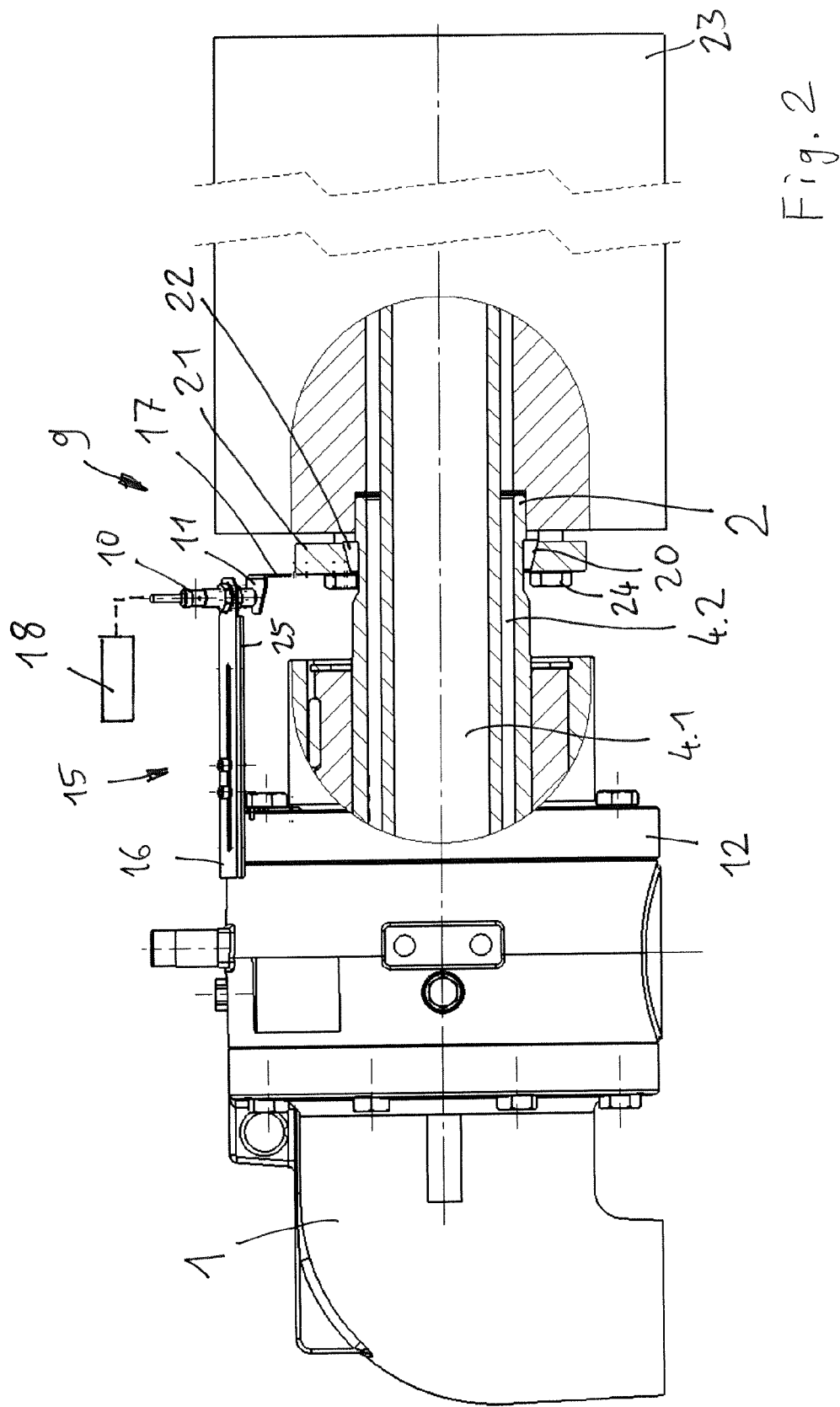
FIG. 2 shows, in a side view, the rotary joint from FIG. 1 with a rotating component connected to the rotor.

FIG. 1 shows, in an axial cross-section, a rotary joint comprising a stator 1 and a rotor 2. Provided in the stator 1 are a first fluid channel 3.1 and a second fluid channel 3.2, of which, for example, one forms a forward flow and the other forms a return flow. Correspondingly, a first fluid channel 4.1 and a second fluid channel 4.2 are also provided in the rotor 2, with the sealing of said channels with respect to each other being visible only in FIG. 2 since an inner pipe section has not yet been inserted into the rotor 2 in the illustration in FIG. 1. The pipe section is merely indicated by the dashed line.

A fluid transfer interface 5 is provided between the stator 1 and the rotor 2, via which fluid can flow from the first fluid channel 3.1 in the stator 1 into the first fluid channel 4.1 in the rotor 2, or vice versa, and fluid can flow from the second fluid channel 3.2 in the stator 1 into the second fluid channel 4.2 in the rotor 2, or vice versa.

The fluid transfer interface 5 is sealed off by a mechanical seal 6, comprising a sliding ring 7 which, in the axial direction X corresponding to the axis of rotation of the rotor 2, bears in an elastically biased manner against at least one mating ring 8, here against two mating rings 8, and forms a seal face therewith. The sliding ring 7 thus advantageously has two axial end faces 7.1, 7.2 at opposite axial ends, each of which bears sealingly against a respective mating ring 8. In the event of relative rotation between the sliding ring 7 and one or both mating rings 8, wear occurs on these end faces 7.1, 7.2. In order to enable the sliding ring 7 to still bear sealingly against the mating rings 8, the rotor 2 and/or the stator 1 is adjusted in its axial position to compensate for the wear. As a result of this adjustment, which can be achieved by elastic biasing (see the elastic biasing force F shown in FIG. 1), the rotor 2 is displaced relative to the stator and/or the stator 1 is displaced relative to the rotor 2 due to an axial movement of the rotor 2 and/or the stator 1.

In the exemplary embodiment shown, one mating ring 8 is arranged in the stator 1 in particular in a rotationally fixed manner, and the other mating ring 8 rotates with the rotor 2.

In order to detect the relative movement in the axial direction X between the stator 1 and the rotor 2 and at the same time to detect the rotational speed of the rotor 2, a rotary encoder 9 and a sensor 10 are provided, which are located opposite each other in the radial direction. The sensor 10 is connected to the stator 1 in a positionally fixed manner, in this case to a housing 12 of the stator 1 which forms a fluid inlet 13 into the first fluid channel 3.1 and a fluid outlet 14 from the second fluid channel 3.2.

The sensor 10 is held in its predefined position radially outside the rotary encoder 9 by way of a support element 15 connected to the housing 12, said support element comprising a sheet-metal strip 16; the rotary encoder is formed by an angled plate 17, which is connected to the rotor 2 and bears or forms, for example, a single discrete marker 11. One preferred exemplary embodiment of the discrete marker 11 can be seen in FIGS. 2 and 3. Here, the discrete marker 11 has the shape of a triangle, the base side of which extends in the circumferential direction of the rotor, and the height of which extends in the axial direction X. Preferably, the discrete marker 11 is simply formed by an angled end of the angled plate 17. This enables particularly cost-effective manufacture. The rotary encoder 9 thus comprises just one single marker 11 over the circumference and extends in the circumferential direction only within the angle range of this marker 11.

Of course, according to other embodiments, a plurality of angled plates 17 or one angled plate 17 having a plurality of arms may also be provided for placing a plurality of markers 11 opposite the sensor 10 in the radial direction, said markers then being arranged at intervals one after the other in the circumferential direction. Other embodiments of the rotary encoder 9 may also be considered, for example in the form of a collar and/or cylinder which extends around the circumferential direction and on which at least one marker 11 or a plurality of markers 11 are provided in a corresponding manner.

By forming one discrete marker 11, an on/off signal is generated by the sensor 10 or a connected control device 18, namely even if the radial gap 19 between the sensor 10 and the rotary encoder 9 or the marker 11 is comparatively large. The axial displacement detection device is therefore particularly robust and easy to calibrate, and is preferably adjustable in the radial direction in the position of the sensor 10 and/or rotary encoder 9.

Although not mandatory, in the exemplary embodiment shown the rotary encoder 9 is connected to the rotor 2 via a wedge connection 20. To this end, an outer ring 21 and an inner ring 22 are provided, which have contact surfaces bearing against each other and oriented at an angle to the axial direction X of the rotary joint when viewed in axial cross-section. The inner ring 22 could be formed in one piece with the rotor 2, but preferably bears against a protrusion in the rotor 2 in the direction of the rotating component 23 connected to the rotor 2, for example a roller, so that, when the outer ring 21 is pulled towards the component 23 by way of a suitable screw connection 24, the entire rotor 2 is pulled towards the component 23 by way of the wedge connection 20 in order to position the rotor 2 in a desired position relative to the stator 1. If the inner ring 22 is slotted, i.e. has a C-shape, it will be pulled towards the rotor 2 when the outer ring 21 is tightened.

The component 23 is supplied with a fluid, for example is cooled, by way of the rotary joint or the fluid channels 3.1, 3.2, 4.1, 4.2. In particular, the component 23 is the calendar roll of a papermaking machine.

FIG. 4 schematically shows an alternative embodiment of a rotary encoder 9, in which a different number of discrete markers 11 are provided in individual axial sections I, II. Nevertheless, the rotary encoder 9 may still be made from a single angled plate 17, namely in that the angled end located opposite the sensor 10 (not shown here) is fork-shaped, and thus a single marker 11 is formed in the axial section I adjoining the radial arm of the angled plate 17, and at least two individual markers 11 spaced apart from each other in the circumferential direction are formed in the region of the free end of the angled plate 17 in the axial section II. Of course, a larger number of markers 11 spaced apart from each other in the circumferential direction may be provided, or more steps and thus multiple axial sections having a different number of markers 11 may be provided.

In the exemplary embodiment shown, the position of the sensor 10 is flexibly adjustable. For instance, the sheet-metal strip 16 of the support element 15 is movable in the axial direction relative to a bracket 25 connected to the housing 12 of the stator 1 by loosening a screw connection and tightening the screw connection again. In addition, the bracket 25 and/or also the angled plate 17 of the rotary encoder 9 may be connected to the housing 12 or the rotor 2 in such a way as to be movable in the radial direction, and/or the sensor 10 may be connected to the support element 15, in particular to the sheet-metal strip 16, in such a way as to be movable in the radial direction.

LIST OF REFERENCE SIGNS

1 stator
2 rotor
3.1 fluid channel
3.2 fluid channel
4.1 fluid channel
4.2 fluid channel
5 fluid transfer interface
6 mechanical seal
7 sliding ring
7.1 end face
7.2 end face
8 mating ring
9 rotary encoder
10 sensor
11 marker
12 housing
13 fluid inlet
14 fluid outlet
15 support element
16 sheet-metal strip
17 angled plate
18 control device
19 radial gap
20 wedge connection
21 outer ring
22 inner ring
23 component
24 screw connection
25 bracket
X axial direction
F biasing force

The invention claimed is:

1. A rotary joint comprising:
a stator and a rotor, each having at least one fluid channel;
a fluid transfer interface between the stator and the rotor, via which a fluid flows from the fluid channel in the stator into the fluid channel in the rotor, or vice versa, wherein the fluid transfer interface is sealed off using a mechanical seal, which comprises an abrasive sliding ring, and the sliding ring bears in an axial direction in an elastically biased manner against at least one mating ring and forms a seal face therewith;
wherein an axial displacement detection device is provided, which is designed to detect, in the event of wear on the sliding ring, an associated axial displacement of the stator and/or rotor;
wherein the axial displacement detection device comprises a rotary encoder on the rotor and a sensor that detects a position of the rotary encoder, said sensor being located radially opposite the rotary encoder, and the rotary encoder comprises at least one discrete marker or a plurality of discrete markers arranged at intervals one after the other in the circumferential direction, said markers being arranged on the rotor, and the at least one discrete marker varies along the axial direction in its extent in the circumferential direction, and/or different numbers of individual discrete markers are provided, one after the other in the circumferential direction, in different axial sections of the rotor.

2. The rotary joint according to claim 1, wherein the position of the sensor and/or of the at least one rotary encoder is adjustable in the radial direction and/or axial direction.

3. The rotary joint according to claim 2, wherein the rotary encoder extends only over part of the circumference.

4. The rotary joint according to claim 2, wherein the rotary encoder extends only over part of the circumference less than 45° or less than 10°.

5. The rotary joint according to claim 1, wherein the rotary encoder extends only over part of the circumference.

6. The rotary joint according to claim 1, wherein the stator comprises a housing having at least one fluid inlet and/or fluid outlet, and the sensor is borne by a support element connected to the housing.

7. The rotary joint according to claim 6, wherein the support element comprises a sheet-metal strip that bears the sensor.

8. The rotary joint according to claim 1, wherein the rotary encoder is formed by an angled plate connected to the rotor.

9. The rotary joint according to claim 1, wherein a control device is provided, which processes signals that are generated by the sensor as a function of the current circumferential position of the at least one marker, wherein the control device and/or the sensor generates a sequence of on/off signals.

10. The rotary joint according to claim 1, wherein a radial gap between the rotary encoder and the sensor is at least 1 or 2 mm.

11. The rotary joint according to claim 1, wherein the sliding ring forms, on each of its two opposite end faces, a seal face with a respective mating ring and is rotatable in the circumferential direction relative to both mating rings.

12. The rotary joint according to claim 1, wherein the at least one discrete marker has a triangular shape.

13. The rotary joint according to claim 1, wherein the rotary encoder extends only over part of the circumference less than 45° or less than 10°.

14. The rotary joint according to claim 1, wherein a radial gap between the rotary encoder and the sensor is at least 5 mm.

\* \* \* \* \*